(12) United States Patent
Knotts

(10) Patent No.: US 10,348,777 B2
(45) Date of Patent: Jul. 9, 2019

(54) TELEHEALTH VIDEO CHAT MIRRORING OF DISPARATE VIDEO CHAT DEVICES

(71) Applicant: Telemerge, Inc., Crofton, MD (US)

(72) Inventor: Chris Knotts, Wye Mills, MD (US)

(73) Assignee: TELEMERGE, INC.

( * ) Notice: Subject to any disclaimer, the term of this patent is extended or adjusted under 35 U.S.C. 154(b) by 311 days.

(21) Appl. No.: 15/139,942

(22) Filed: Apr. 27, 2016

(65) Prior Publication Data

US 2016/0323324 A1    Nov. 3, 2016

Related U.S. Application Data

(60) Provisional application No. 62/154,917, filed on Apr. 30, 2015.

(51) Int. Cl.
*G06F 15/16*    (2006.01)
*H04L 29/06*    (2006.01)

(52) U.S. Cl.
CPC .......... *H04L 65/103* (2013.01); *H04L 65/104* (2013.01); *H04L 65/403* (2013.01); *H04L 65/605* (2013.01)

(58) Field of Classification Search
CPC .......... H04N 7/15; H04N 7/152; H04N 7/147; H04N 7/141; H04N 5/2258; H04N 5/2624; H04N 5/272; H04N 7/148; H04N 7/155; H04L 65/403; H04L 65/1069; H04L 65/4038; H04L 12/1822; H04L 12/1813; H04L 12/1818; H04L 12/1827; H04L 65/1006
See application file for complete search history.

(56) References Cited

U.S. PATENT DOCUMENTS

| | | | | |
|---|---|---|---|---|
| 2010/0188476 A1* | 7/2010 | Thapa | ..................... | H04N 7/147 348/14.08 |
| 2011/0249073 A1* | 10/2011 | Cranfill | .................. | H04N 7/147 348/14.02 |
| 2013/0152153 A1* | 6/2013 | Weiser | ................ | H04L 63/0236 726/1 |
| 2014/0313278 A1* | 10/2014 | Periyannan | ........... | H04L 65/403 348/14.08 |

* cited by examiner

*Primary Examiner* — Michael A Keller
*Assistant Examiner* — Thao D Duong
(74) *Attorney, Agent, or Firm* — William H. Bollman

(57) ABSTRACT

A multi-channel, two-way video chat mirroring communication system capable of mirroring disparate video clients at a central coordinator terminal into a two-way video and audio conversation with one another. The central coordinator mirroring terminal system is functionally placed in the middle between a provider video chat user device, and a patient's video chat user device. The central coordinator mirroring terminal manages an individual video and audio link with a provider's video chat user device using the provider's preferred communication technology, and another individual video and audio link with the patient's video chat user device that uses its own preferred communication technology, which may or may not be the same as that of the provider's video chat user device. Because the video-mirroring system manages those individual video and audio streams, it produces a seamless experience for both the provider's video chat user device and the patient's video chat user device.

15 Claims, 13 Drawing Sheets

TELEHEALTH VIDEO CHAT MIRRORING OF DISPARATE VIDEO CHAT DEVICES

This application claims priority from U.S. Provisional No. 62/154,917, entitled "Telehealth Service Bridging Multiple Commercial Video Chat Clients with an Optional Call Coordinator", filed Apr. 30, 2015, the entirety of which is expressly incorporated herein by reference.

BACKGROUND OF THE INVENTION

1. Field of the Invention

This invention relates generally to video chat telecommunications, and more particularly to a video chat system enabling a provider to facilitate a video chat between disparate video chat devices.

2. Background of Related Art

Conventional telehealth programs such as Patient Centered Medical Home (PCMH) promise a way to improve health care in America by transforming how primary care is organized and delivered, but are dependent upon communications between a patient and their provider. Under PCMH, primary care physicians have a regular and ongoing chat with their chronically ill or otherwise demanding patients just from a care standpoint. Physicians can keep in touch with their patients, e.g., every couple of weeks, with a scheduled telephone call making sure that their patients are taking their medications, making sure that their patients are following up with wound care, with the overall intent to avoid hospital readmissions.

The Agency for Healthcare Research and Quality (AHRQ) defines a medical home not simply as a place but as a model of the organization of primary care that delivers the core functions of primary health care.

The primary care medical home is accountable for meeting the large majority of each patient's physical and mental health care needs, including prevention and wellness, acute care, and chronic care. Providing comprehensive care requires a team of care providers. This team might include physicians, advanced practice nurses, physician assistants, nurses, pharmacists, nutritionists, social workers, educators, and care coordinators. Although some medical home practices may bring together large and diverse teams of care providers to meet the needs of their patients, many others, including smaller practices, may build virtual teams linking themselves and their patients to providers and services in their communities.

The primary care medical home provides health care that is relationship-based with an orientation toward the whole person. Partnering with patients and their families requires understanding and respecting each patient's unique needs, culture, values, and preferences. The medical home practice actively supports patients in learning to manage and organize their own care at the level the patient chooses. Recognizing that patients and families are core members of the care team, medical home practices ensure that they are fully informed partners in establishing care plans.

The primary care medical home coordinates care across all elements of the broader health care system, including specialty care, hospitals, home health care, and community services. Such coordination is particularly critical during transitions between sites of care, such as when patients are being discharged from the hospital. Medical home practices also excel at building clear and open communication among patients and families, the medical home, and members of the broader care team.

An attempt to launch PCMH was made with Microsoft Link™ (now called SKYPE FOR BUSINESS™). The present inventor appreciated that this attempt ran into difficulties with usability, was too difficult for the end users (patients) to get the SKYPE FOR BUSINESS™ program installed, and required an inordinate amount of time on technical troubleshooting.

Recent research has shown that 75 million 'virtual' doctor visits, or 1 in 6, will occur now in a given year. It has been forecast that the video telemedicine market in North America alone will grow at a compound annual growth rate of 16.7 percent from 2012 to reach an estimated more than $600M in 2017. It has been said that this growth will intensify as telehealth initiatives align with the goals of the Federal government and Accountable Care Organizations (ACOs) to reduce healthcare spending and improve the quality of patient care.

Currently, the present inventor has realized that a major barrier to mass adoption of telehealth is the complexity of current proprietary application-based solutions. Conventional telehealth methods and systems require custom user applications to be installed at both the doctor's user device as well as each patient's user device.

There is a need for a better communication system to facilitate an effective and efficient telehealth solution.

SUMMARY OF THE INVENTION

The following presents a simplified summary to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

A method and system are provided to enable telehealth consultation using video chat devices having disparate video clients. A first video chat communication channel is established between a first video chat user device using a first type video client, and a first video chat channel of a coordinator workstation terminal. A second video chat communication channel is established between a second video chat user device using a second type video client, and a second video chat channel of the coordinator workstation terminal. The first video chat communication is video mirrored with the second video chat communication channel, to effectively form a mirrored video chat communication channel between the first video chat user device and the second video chat user device. In this way, the video mirroring enables the first video chat user device using the first type video client to video chat with the second video chat user device using the second type video client.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a multi-channel, two-way video chat mirroring communication system capable of mirroring disparate video clients at a central coordinator terminal into a two-way video and audio conversation with one another. The disclosed video mirroring communication system is modular, reproducible, and scalable. As disclosed, the central coordinator terminal is capable of setting up multiple channels of communication between disparate video chat client devices so as to maximize efficiency.

In simplified form, video mirroring provides isolated video chat system interoperability between disparate video chat devices without the need to "break into" the software stack of either video chat client on either computer 402, 404. There is no conventional product to provide isolating video chat client mirroring as required by the present invention.

Figure 4:
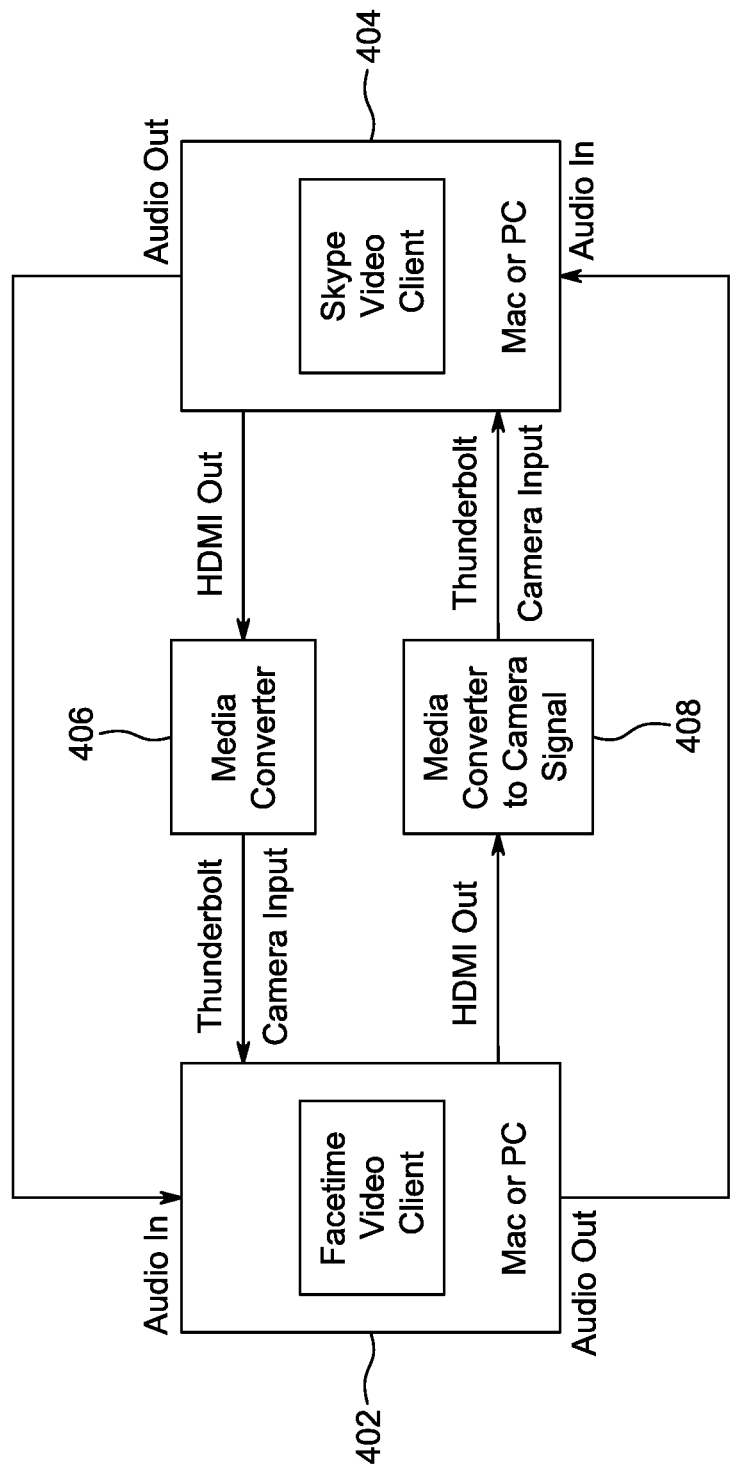
FIG. 4 depicts a simplified FACETIME™ embodiment of video chat mirroring, in accordance with the principles of the present invention.

FIG. 4 depicts an a simplified FACETIME™ to SKYPE™ embodiment of video chat mirroring, wherein video of a first computer (mac or PC) 402 operating as a FACETIME™ video chat client is video 'mirrored' to a second computer (mac or PC) 404 operating as a SKYPE™ video chat client, via media converters 406, 408. Audio output from the first computer 402 is input to the second computer 404, and audio output from the second computer 404 is input to the first computer 402.

In this embodiment, the isolating video chat client mirroring technique is implemented inside of the separate, switched video system between two separate computers 402, 404 without requiring actual display of the video stream and without requiring audible output of audio. In this embodiment the video display digital output (HDMI) of the first computer (PC, MAC, etc.) 402 is connected to the camera input of the second computer 404, and the video display digital output (HDMI) of the second computer 404 is connected to the camera input of the first computer 402.

The disclosed embodiments relate to provision of a connected health solution, with an open telehealth service that allows healthcare providers to deliver secure, branded care to patients, each through their own particular portal device (wireless phones, laptops, tablets, etc.) and each using their own favorite video chat client, including FACETIME™ commercially available from APPLE™, HANGOUTS™ commercially available from GOOGLE™, and SKYPE™ commercially available from MICROSOFT™.

The video communications are controlled and facilitated by a Symphony™ central coordinator mirroring terminal. The central coordinator mirroring terminal provides telehealth services by securely bridging any popular or otherwise legacy video chat technology (e.g., FACETIME™, HANGOUTS™, SKYPE™, etc.) using an inventive video chat mirroring system that isolates two disparate video chat devices—without requiring installation of a proprietary application on either video chat device, e.g., either a provider client device or a patient client device. Thus, virtual care can be provided by a clinician without the burden of learning and maintaining new telehealth hardware or programs, by either the clinician or the patient. The central coordinator mirroring terminal includes a computer controlled video mirroring bridge, which establishes at least one (and preferably a plurality) of channels of mirrored video chat. The video mirroring bridge is under the control of a televisit coordinator workstation terminal to enable branded health care delivery over widely-available (and disparate) video chat or messaging clients.

The present invention enables use of the secure video messaging technology already present on over 7 billion smartphones, tablets, laptop computers, and desktop computers. Patient devices need not install any specialized proprietary software to communicate via video with their health provider system—even when their provider uses a different video client.

The disclosed embodiments of the present invention are HIPAA compliant, with all audio and video communications preferably encrypted to protect the privacy of patient information, and to allow clinicians at a clinician terminal device such as their own smartphone, tablet, laptop computer, etc., to consult securely with patents at their own terminal devices (e.g., smartphone, tablet, laptop computer, etc.)

The described embodiments of a video-mirroring telehealth system permit health 'visits' to connect app-free with patients via their smartphones, etc., while working with existing EMR and scheduling systems.

Before the present invention, telehealth using proprietary software at either a provider's user device or a patient's user device required the same proprietary software to also be loaded on the other user device. Now, with video chat mirroring provided by the present invention, any user device can utilize any video client that is native to their user device and already installed and operational (e.g., FACETIME™), to communicate with a user device within a proprietary video chat (e.g., VSee™).

The central coordinator mirroring terminal system is functionally placed in the middle of video chat communications, between a provider video chat user device, and a patient's video chat user device. The central coordinator mirroring terminal manages an individual video and audio link with a provider's video chat user device using the provider's preferred communication technology, and another individual video and audio link with the patient's video chat user device that uses its own preferred communication technology, which may or may not be the same as that of the provider's video chat user device. Because the video-mirroring system manages those individual video and audio streams, it produces a seamless experience for both the provider's video chat user device and the patient's video chat user device.

The video-mirroring system reduces health costs by making efficient use of a clinician's time by engaging the clinician through their own preferred video chat user device, but preferably only after the patient's video chat user device is first connected in a video chat channel with the central coordinator mirroring terminal. A patient's experience is seamless, providing personalized telehealth without the hassle or need for the patient's video chat user device to first install a custom video chat application, or having to first troubleshoot system compatibility with the patient's particular user device (smartphone, tablet, laptop, desktop, etc.)

Thus, with the video-mirroring central coordinator mirroring terminal system, healthcare providers are able to offer virtual care without the burden of learning and maintaining new telehealth hardware or programs.

Figure 1:
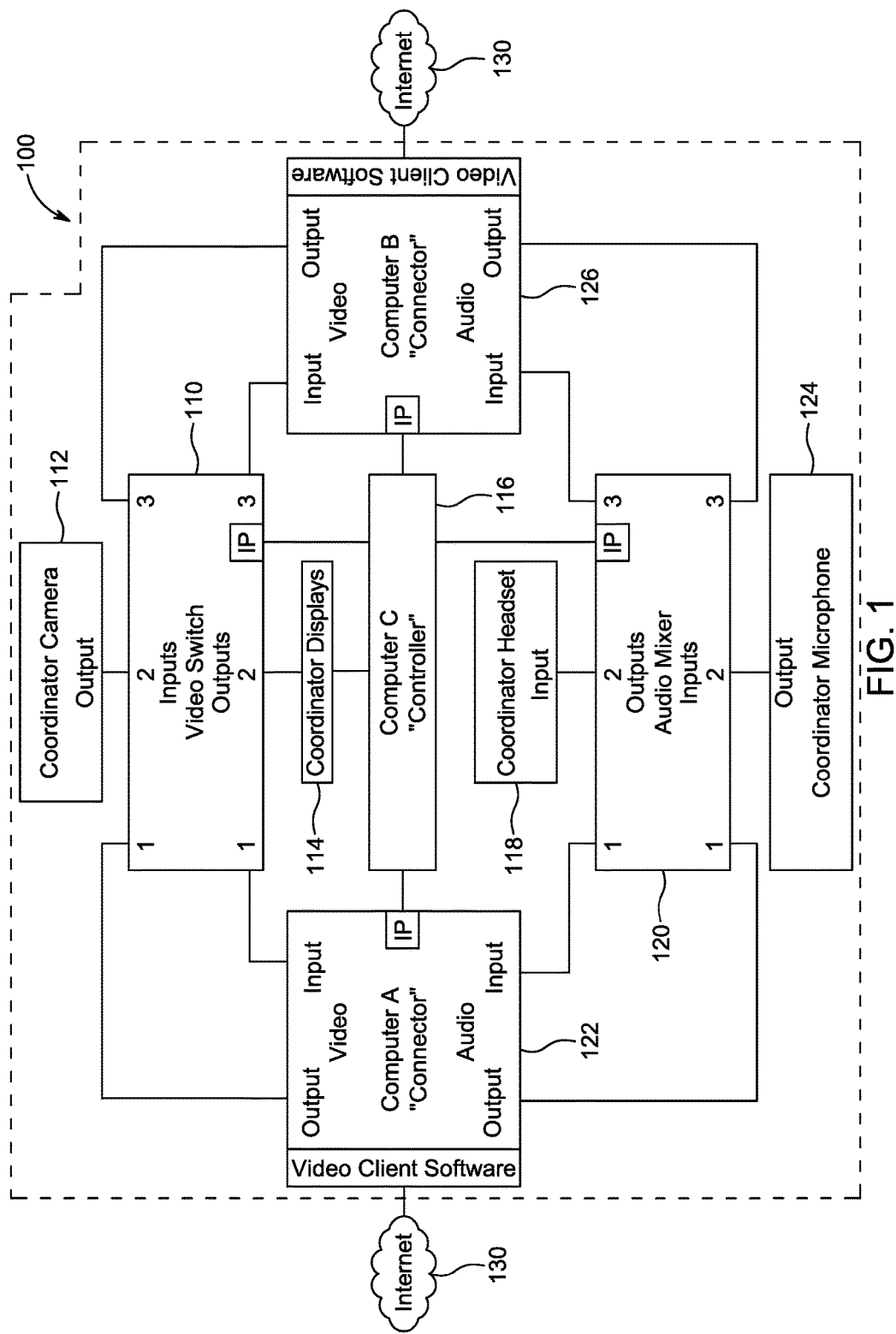
FIG. 1 shows a simplified view of a Symphony™ central coordinator video chat mirroring terminal system including a plurality of video chat connections for linking with end user devices, and a televisit coordinator workstation terminal, in accordance with the principles of the present invention.

FIG. 1 shows a simplified view of a Symphony™ central coordinator video chat mirroring terminal system including a plurality of video chat connections for linking with end user devices, and a televisit coordinator workstation terminal, in accordance with the principles of the present invention.

In particular, as shown in FIG. 1, the central coordinator video chat mirroring terminal 100 comprises a first "connector" computer A 122 for communication with a given provider device; a second "connector" computer B 126 for communication with a given patient device; and a central "controller" computer C. The coordinator terminal 100 includes coordinator displays 114 (e.g., three to four separate displays), a coordinator headset 118, and a coordinator camera 112 to film the individual operating the coordinator terminal 100.

A video switch 110 switches the video input and output between the connector computer 122 to the provider's video chat device, the central coordinator's displays 114 and camera 112, and the connector computer 126 to the patient's video chat user device.

An audio mixer 120 switches the audio input and output between the connector computer 122 to the provider's video chat device, the central coordinator's headset 118 and microphone 124, and the connector computer 126 to the patient's video chat user device.

The coordinator's controller computer 116 communicates with the connector computers 122, 126, preferably by way of an Internet Protocol (IP) link to each.

The central coordinator video chat mirroring terminal 100 mirrors captured video and audio streams from one user device (e.g., from a doctor's user device), and mirrors that captured video and audio stream to the other user device (e.g., the patient user device), and vice versa.

The central coordinator mirroring video chat mirroring terminal 100, at its core, contains an audio mixer 120 and a video mirroring bridge formed by a specifically configured and controlled video switch 110. The resulting audio and video mirroring bridge allows the video client of one end point user device to be seen at the televisit coordinator workstation terminal 112, 114, 118, 124 in a first point-to-point video and audio channel. The televisit coordinator workstation terminal 112, 114, 118, 124 can also display and audibly output another end point user device in a separate, second point-to-point video and audio channel. The televisit coordinator workstation terminal 112, 114, 118, 124 preferably resides between the provider's video chat user device at one end point, and the patient's video chat user device at the other end point.

The Symphony™ central coordinator video chat mirroring terminal system 100 is an open, interoperable telehealth communication system that enables a rich and accessible health care experience using a patient's entrenched video communication application, e.g., FACETIME™, HANGOUTS™, SKYPE™, etc. With the central coordinator video chat mirroring terminal system 100, patients and clinicians (e.g., doctors, nurse practitioners, etc.) don't need to install any new software on their video chat user devices (smartphones, tablets, laptops, etc.) Rather, they simply place or answer a video call using technology that they already have on their smartphone, e.g., FACETIME™, SKYPE™, or GOOGLE HANGOUTS™. This is the case for both the patient's video chat user device as well as the provider's video chat user device.

If there are technical issues with either end user establishing a video chat with the televisit coordinator workstation terminal 112, 114, 118, 124, then the televisit coordinator workstation terminal 112, 114, 118, 124 can be troubleshoot one-on-one with the party to get them up and running in their preferred video chat application.

The video chat mirroring is accomplished with a front-end integration, so the video client (whatever it might be, whether SKYPE™, I FACETIME™, etc.) between the televisit coordinator workstation terminal 112, 114, 118, 124 and the patent's video chat user device is not broken. And the video client between the televisit coordinator workstation terminal 112, 114, 118, 124 and the clinician's video chat user device is similarly not broken. The video clients are not broken in terms of use, and the video clients are not broken in terms of encryption. This is significant in proprietary video communication systems, e.g., those provided by APPLE™, as there is no access to the software stack because it's a proprietary and closed system.

Thus, using video chat mirroring in the audio and video bridging system of a central coordinator video chat mirroring terminal 100, even though the video clients are closed, a SKYPE™ video chat user device can video chat seamlessly with a FACETIME™ video chat user device; or a FACETIME™ video chat user device can video chat seamlessly with a GOOGLE HANGOUTS™ user device; etc. Accordingly, the present invention provides a unique video mirroring technique not found in conventional systems.

Figure 2:
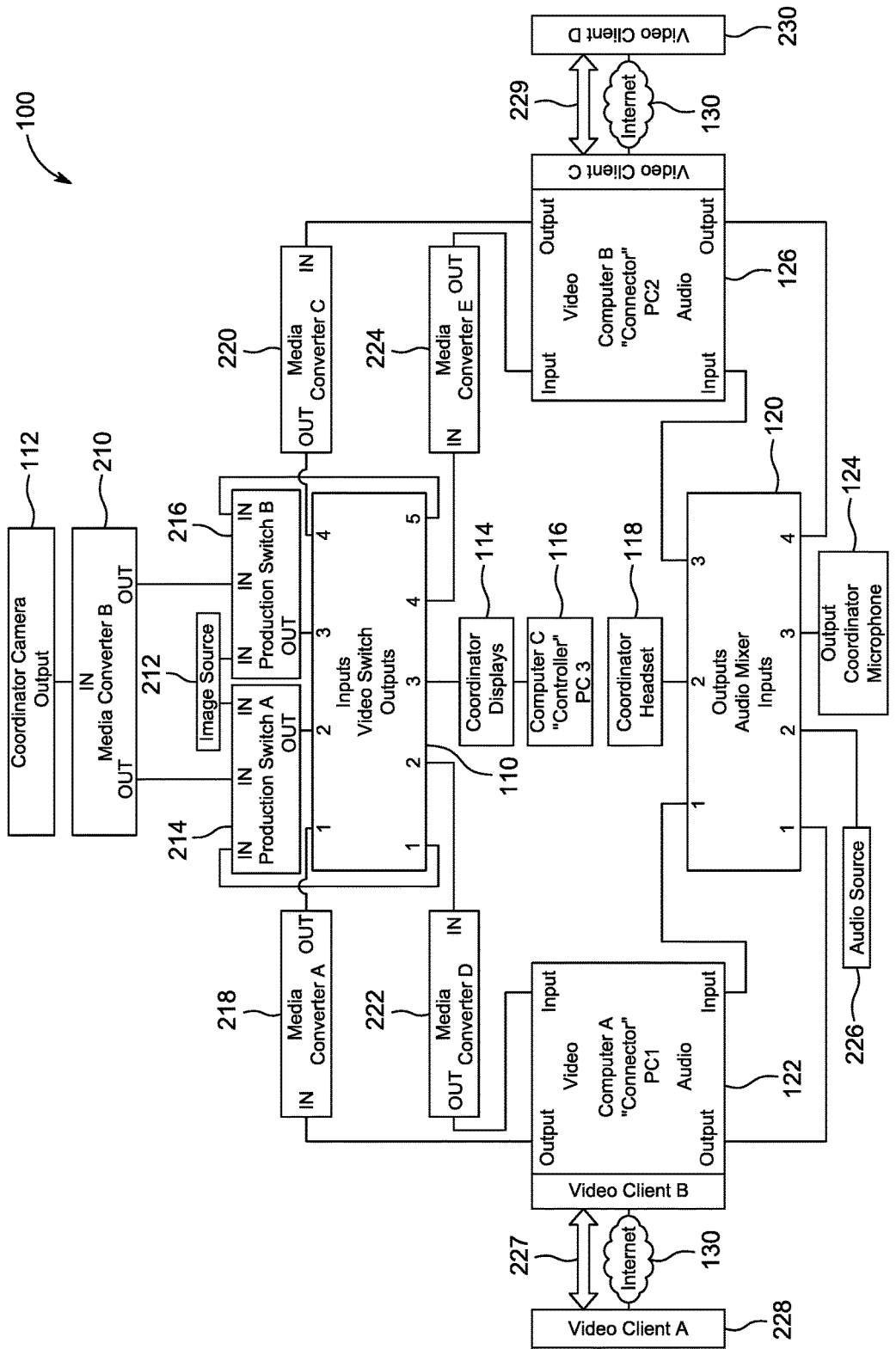
FIG. 2 is a more detailed view showing a central coordinator video chat mirroring terminal including a plurality of video chat connections for linking with end user devices, video mirroring media converters, and a televisit coordinator workstation terminal, in accordance with the principles of the present invention.

FIG. 2 is a more detailed view showing a central coordinator video chat mirroring terminal including a plurality of video chat connections for linking with end user devices, video mirroring media converters, and a televisit coordinator workstation terminal, in accordance with the principles of the present invention.

In particular, FIG. 2 shows implementation of media converters (aka media adapters) A-E 218, 210, 220, 222, 224, respectively, and production switches 214, 216, comprised in a central coordinator video chat mirroring terminal 100.

The central coordinator video chat mirroring terminal 100 may be multichannel, so that the televisit coordinator workstation terminal 112, 114, 118, 124 can get one video chat communication channel 227, 229 set up and connected, extract itself, then move to the next video call, etc. Alternatively, multiple televisit coordinator workstation terminals 112, 114, 118, 124 may be networked to the central coordinator video chat mirroring terminal 100 to accommodate multiple televisit channels.

The central coordinator video chat mirroring terminal 100 may comprise one or multiple (e.g., up to 6) point-to-point video chat mirroring communication channels 227, 229. In a larger scale system these point-to-point video chat mirroring communication channels 227, 229 may be established by separate televisit coordinator workstation terminals. Both point-to-point video chat communication channels 227, 229 are controlled and ultimately mirrored to one another under the control of a common televisit coordinator workstation terminal 112, 114, 118, 124.

The central coordinator video chat mirroring terminal 100 enables a personalized telehealth service without the hassle of first installing an additional application, or having to first troubleshoot system compatibility. The central coordinator video chat mirroring terminal 100 provides a powerful telehealth solution that enables the expansion of health care options, and extends a custom brand of the healthcare provider or practice, to deliver a positive patient experience.

The central coordinator video chat mirroring terminal 100 is preferably modular and scalable. In exemplary embodiments, the controller computer 116 is a MAC computer, but of course can be any personal computer (PC), server, or the like.

At the functional center of the central coordinator video chat mirroring terminal 100, between the connecting computer A 122 and connecting computer B 126, is a video and audio mirroring bridge formed by a video switch 110 and an audio switch (i.e., a multichannel audio mixer) 120. The controller computer C 116 controls operations of the elements within the central coordinator video chat mirroring terminal 100, and is the basis for the televisit coordinator workstation terminal 112, 114, 118, 124.

The video chat connecting computer A 122, connecting computer B 126, and controller computer C 116, each have respective video and audio inputs/outputs.

The audio mixer 120, in the disclosed embodiments, is a model 16a commercially available from MOTU.

Connecting computer A 122, connecting computer B 126, and controller computer C 116 are, in the disclosed embodiments, commercially-available Apple Mac mini computers, but of course could be any personal computer (PC), Mac, server or the like.

The coordinator camera 112 at the televisit coordinator workstation terminal 112, 114, 118, 124 is, in the disclosed embodiments, a model "HDR 506" commercially available from CANON.

The coordinator microphone 124 at the televisit coordinator workstation terminal 112, 114, 118, 124 is, in the disclosed embodiments, a standard condenser mic, and the coordinator headset 118 is a standard stereo headphone set.

The video switch hub 110 is, in disclosed embodiments, commercially available from Blackmagic Design, to provide studio quality video switching. The audio mixer 120 is, in disclosed embodiments, a commercially available 16- or 24-port audio mixer from Motu™. The video switch hub 110, and the audio mixer 120, ideally include a software control plane, i.e., a software API that can be controlled, e.g., from the controller computer 116 of the central coordinator video chat mirroring terminal 100.

The embodiments of the present invention utilize studio quality video. Studio quality video in the United States is the NTSC standard 59.94 frames per second (FPS), whereas commercial quality video in the United States is 60 FPS. In accordance with the present invention, all video components in the disclosed two-way mirroring video communication system function at the international PAL rate of 50.00 FPS.

Production switches 214, 216 are used to provide audio and video transitioning effects to enable the central coordinator video chat mirroring terminal 100 to present, e.g., a welcome screen to users, a hold screen, bring in the audio, and do clean fades between video feeds. Production switches 214, 216 are similar to the video switch 110, but have more capability, e.g., fade in and fade out, etc. When the televisit coordinator workstation terminal 112, 114, 118, 124 is setting up a video chat call, all video streams are fed through the production switches 214, 216. At the end of the involvement (i.e., call setup) established by the televisit coordinator workstation terminal 112, 114, 118, 124, when the video chat streams 227, 229 respectively from video chat user device A and video chat user device B are mirrored together, and the central coordinator video chat mirroring terminal 100 exits out of the video chat call, the video switch 110 operates to disconnect or remove production switch A 214 and production switch B 216 out of the loop, and then the video chat call is continued by mirroring performed by the audio and video bridge formed by established switching in the video switch 110 and audio mixer 120.

Production switch A 214 and Production switch B 216 are, in disclosed embodiments, commercially available from Blackmagic Design. The Blackmagic products implemented in disclosed embodiments are used in ways that they were not intended to be used by the manufacturer.

In yet another embodiment, video broadcast quality equipment (media converters) were repurposed and connected in a unique configuration. Thus media converters, intended for use in video post-production, and for networking computers to video production switches, are implemented by the present invention in such a way as to provide isolating video chat client mirroring. The media converters 218, 210, 220, 222 and 224 are implemented in accordance with the principles of the present invention so as to take an HDMI video input, and convert that into a camera signal that a video client like FACETIME™ recognizes as a valid, recognizable camera.

The particular media converter 218, 210, 220, 222 and 224 chosen for the disclosed embodiments to provide video conversion from HDMI video to a Thunderbolt camera input that FACETIME™ recognizes, is an UltraStudio Mini Recorder commercially available from Blackmagic Design. The chosen media converter allows an HDMI video input to be presented to a MAC or PC computer as a camera feed over Thunderbolt. Thunderbolt is an advancement of Universal Serial Bus (USB).

HDMI supports an audio channel, so at best conventionally the audio might otherwise be routed through the same media converter device. However, the present inventors have appreciated that this is not the ideal situation. The inventors appreciated that significant and unacceptable audio delays and poor audio quality result from 'mirrored' conversion of HDMI audio.

Thus, in accordance with important embodiment of the present invention, audio was routed outside of audio already within the HDMI video, or 'out-of-band' with respect to the video signal in the HDMI. Instead of using the present audio channel within the HDMI, analog audio is mirrored out-of-band of the corresponding digital HDMI video. Thus, in accordance with the present invention, in addition to the routing of HDMI digital video signal through the media converters 218, 210, 220, 222 and 224, the speaker output of connector computer A 122 is connected to the microphone input of connector computer B 126, and the microphone input of connector computer A 122 is connected to the speaker output of connector computer B 126, to provide acceptable audio synchronization with the corresponding mirrored digital video.

Preferably the native 'in-band' audio within the FIDMI video signal is turned off.

An in-synch video and audio experience is provided for the end users such that a user device A linked via video chat to connector computer A 122 has an experience as if it is communicating directly with a user device B linked via video chat to connector computer B 126 using user A's video client application, when in reality user device B has an entirely different video client than user device A.

Accordingly, the mirroring of video chat channels within the Symphony™ central coordinator video chat mirroring terminal 100 is accomplished with front plane integration by implementing a unique combination and integration of off-the-shelf audio and video bridging components. The video chat mirroring is accomplished by orchestration and control of audio and video switching components that occur within the central coordinator video chat mirroring terminal 100.

The video chat channels established by the televisit coordinator workstation terminal 112, 114, 118, 124 are mirrored using front plane integration, as opposed to back plane integration. In particular, instead of back plane integration which would be accomplished at the software level, the present invention mirrors video chat channels with front plane integration, which is in front of the software, and works with video and audio outputs, rendering the central coordinator video chat mirroring terminal 100 infinitely flexible. Thus, the present invention has the capability to provide a video chat mirroring isolation of two disparate, proprietary video chat channels.

Any video client that works on a PC, or on a MAC, or laptop, e.g., VSee™, can be mirrored by the central coordinator video chat mirroring terminal 100 to enable users to communicate with any other video client (e.g., FACE-TIME™, SKYPE™, etc.) Because the proprietary software such as VSee™ is front plane integrated, it can be accommodated within the Symphony™ video chat mirroring system within minutes of installation of the relevant application.

The video switch 110 is preferably television studio quality and software controllable through an application program interface (API).

The multichannel audio mixer 120 is preferably studio quality and software controllable.

Figure 3:
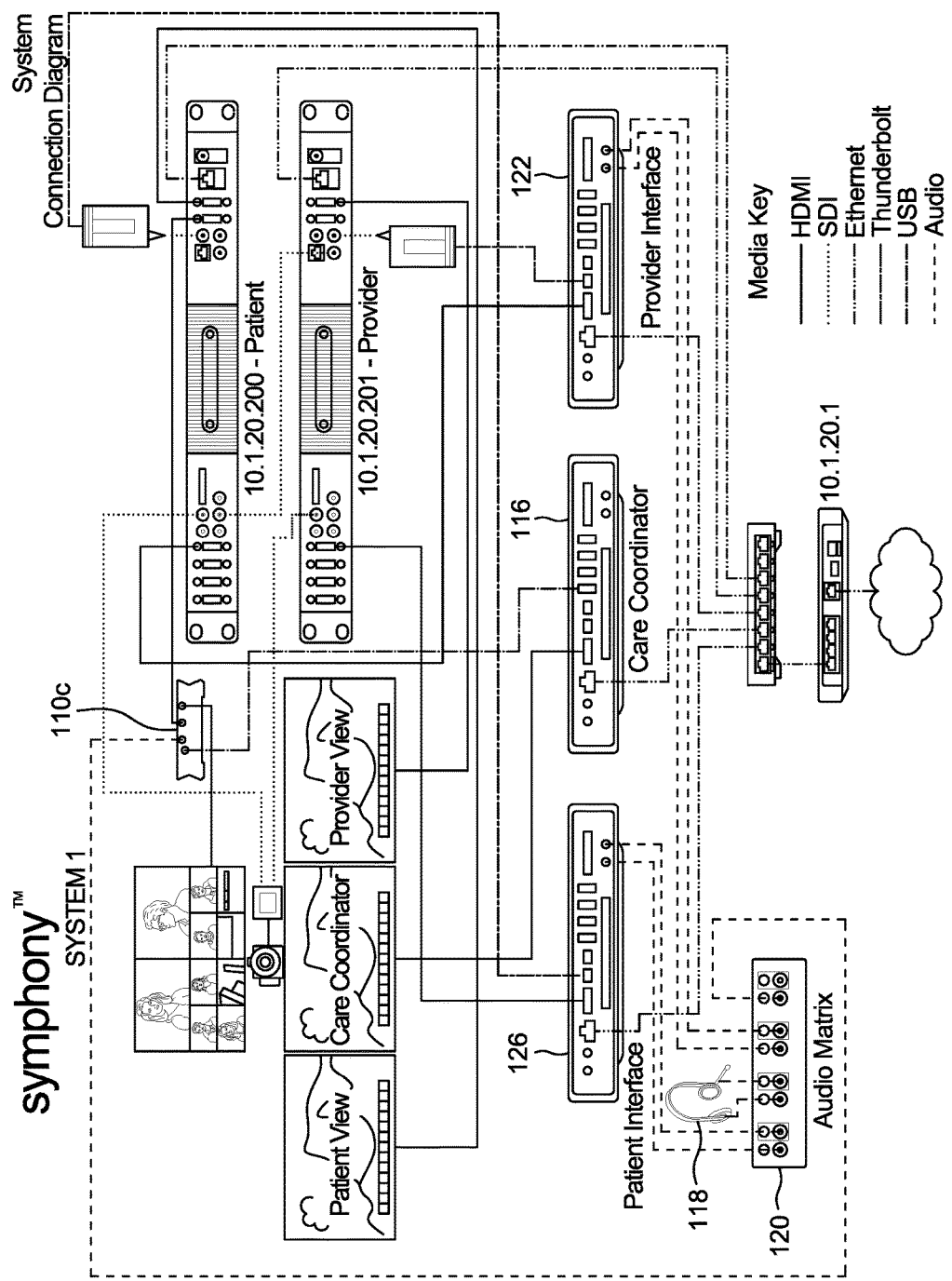
FIG. 3 shows elements within an exemplary central coordinator video chat mirroring terminal, in accordance with the principles of the present invention.

FIG. 3 shows elements within an exemplary central coordinator video chat mirroring terminal, in accordance with the principles of the present invention.

In disclosed embodiments, the video switch 110 is, in disclosed embodiments, actually three separate video switches connected together. As disclosed, one commercially-available BlackMagic Smart Videohub, and two BlackMagic ATEM together form the video switch 110.

Also, ATEM Television Studios, commercially available from Blackmagic Design, are implemented.

Figure 5:
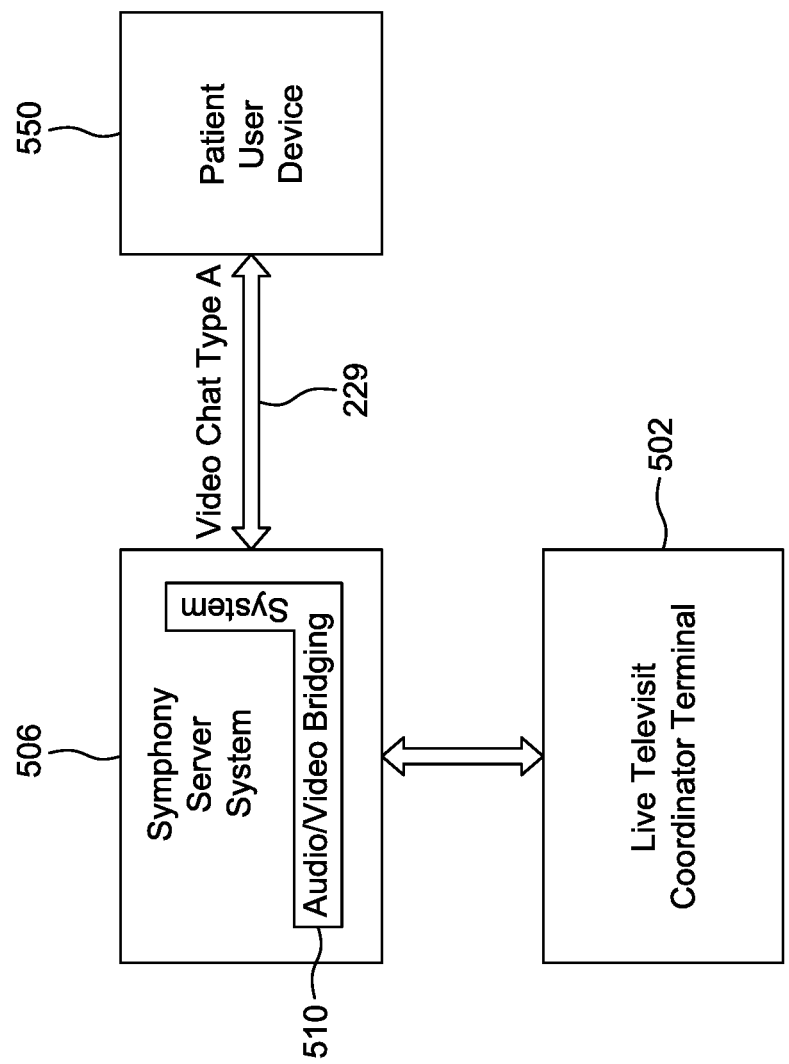
FIG. 5 depicts establishment of a video chat channel with a patient's video chat user device of a first video chat type, with a central coordinator video chat mirroring terminal, under the control of a televisit coordinator workstation terminal, in accordance with the principles of the present invention.

FIG. 5 depicts establishment of a video chat channel with a patient's video chat user device of a first video chat type, with a central coordinator video chat mirroring terminal, under the control of a televisit coordinator workstation terminal, in accordance with the principles of the present invention.

In particular, as shown in FIG. 5, a televisit coordinator workstation terminal 112, 114, 118, 124 controls establishment of a first video chat with a patient's video chat user device 550 via an audio and video bridge of a central coordinator video chat mirroring terminal 100.

When the patient's video chat user device 550 answers the video call, it preferably is presented with video branding associated with the health care provider or practice.

The central coordinator video chat mirroring terminal 100 first links the patient's video chat user device 550 with a live televisit coordinator at the televisit coordinator workstation terminal 112, 114, 118, 124 (collectively 502). The central coordinator video chat mirroring terminal 100 will later also be linked to the provider's video chat user device 710 by the televisit coordinator workstation terminal 502 (FIG. 7) as well. Preferably the link between the televisit coordinator workstation terminal 502 and the provider's video chat user device 710 is established after the video chat is established between the televisit coordinator workstation terminal 100 and the patient's video chat user device 550, to maximize efficiency for the provider.

The live operator of the televisit coordinator workstation terminal 502 will ensure that they have established a video chat link with the correct patient, at the correct time, that there are no technology issues, etc., then essentially place that new video chat (video and audio) link 229 with the patient's video chat user device 550 on hold while another video chat link 227 is established by the televisit coordinator workstation terminal 502 with the provider (e.g., doctor) video chat user device 710.

From a displayed call coordination panel, the televisit coordinator workstation terminal 502 is activated to set the patient's video display to a welcome screen. The televisit coordinator workstation terminal 502 opens the desired video client on connector computer B 126 to begin a video and audio connection to the patient's video chat user device 550. The televisit coordinator workstation terminal 502 prompts for input of the patient's video client user name in the video client, and initiates a video and audio connection to the patient's video chat user device 550.

The televisit coordinator workstation terminal may switch the patient video client to full screen mode, and make orientation changes if necessary. Once the patient user device 550 answers and the patient at the patient user device 550 is visible on the patient video client display screen of the televisit coordinator workstation terminal 502, the televisit coordinator workstation terminal 502 switches the call coordination panel to Coordinator-to-Patient mode, which initiates a live video and audio session between the televisit coordinator workstation terminal 502 and the patient user device 550.

Figure 6:
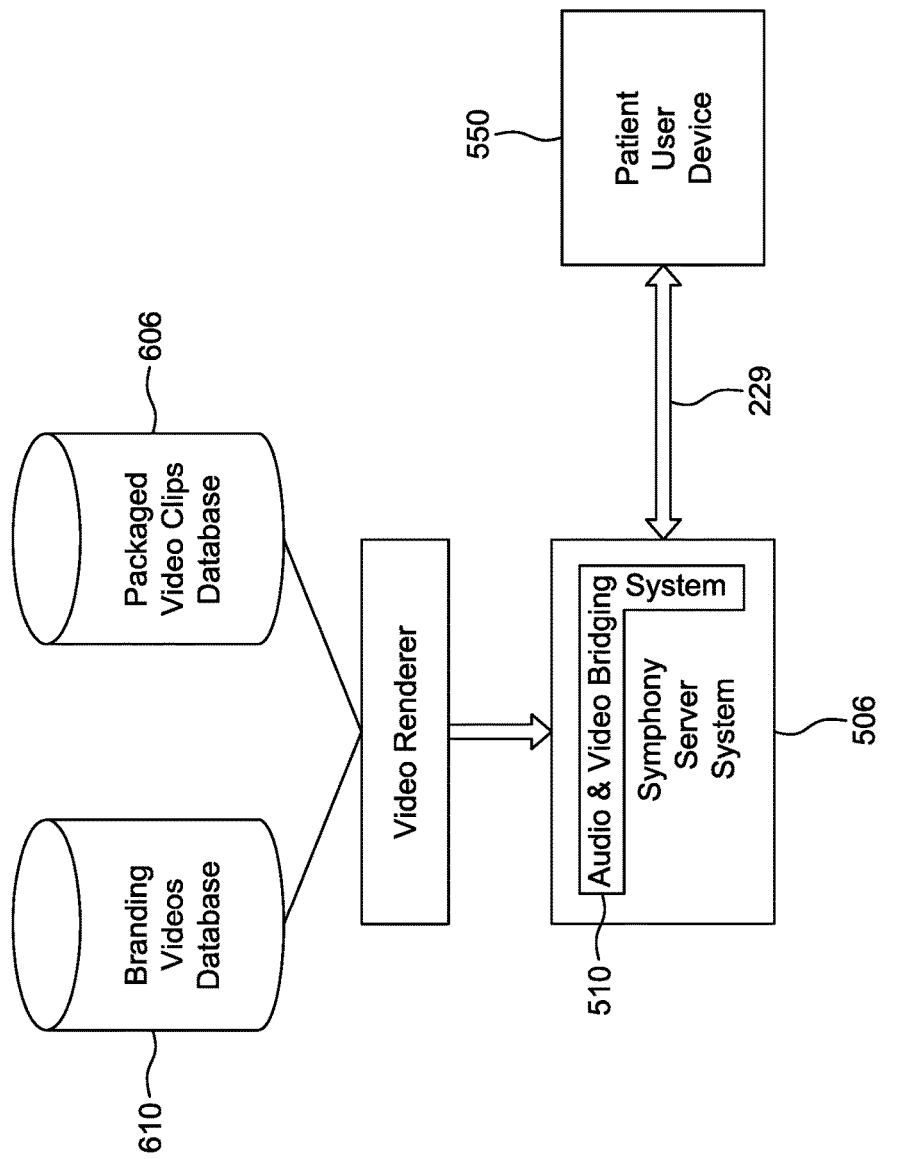
FIG. 6 shows connection of a video chat channel with a patient user device to content from a branding video database and/or a packaged video clip database to effect a hold status, in accordance with the principles of the present invention.

FIG. 6 shows connection of the patient's video chat communication channel 229 with video content from a branding video database 610 and/or a packaged video clip database 606 to effect a hold status, in accordance with the principles of the present invention.

A packaged video clip may be selected from the packaged video clips database 606 for presentation to the patient's video chat user device 550 while they are "on hold".

Alternatively, or additionally, a branding video may be selected from a branding video database 610 and presented to the patient's video chat user device 550 while "on hold", and/or upon initial setup of the video chat.

In operation, telehealth visits are delivered seamlessly, with initiation by a live coordinator at the televisit coordinator workstation terminal 100 in control of the central coordinator video chat mirroring terminal 100, and connected app-free to the patient's video chat user device 550, e.g., smartphone, tablet, laptop computer, PC, etc. Each telehealth session may preferably display unique branding of the respective provider's practice to the patient's video chat user device 550, and engage the healthcare provider (i.e., the clinician such as a doctor, nurse practitioner, etc.) only after preliminaries with the patient at the patient's video chat user device 550 are completed.

The live coordinator at the televisit coordinator workstation terminal 502 may greet the patient at the patient's video chat user device 550, and ask about the quality of the connection and troubleshoot any audio or video connection issues as necessary until satisfied with the connection. When the video and audio connection with the patient's video chat user device 550 to the central coordinator video chat mirroring terminal 100 is satisfactory, the televisit coordinator workstation terminal 502 may then place the patient's video chat user device 550 on hold, e.g., by selection of a "hold" control relating to the patient side of a call coordination panel on a display screen 114 of the televisit coordinator workstation terminal 502.

Preferably each video chat session with a patient's video chat user device 550 may display customized branding video or images of an individual practice or medical system to the display of the patient's user device 550 while on hold.

Figure 7:
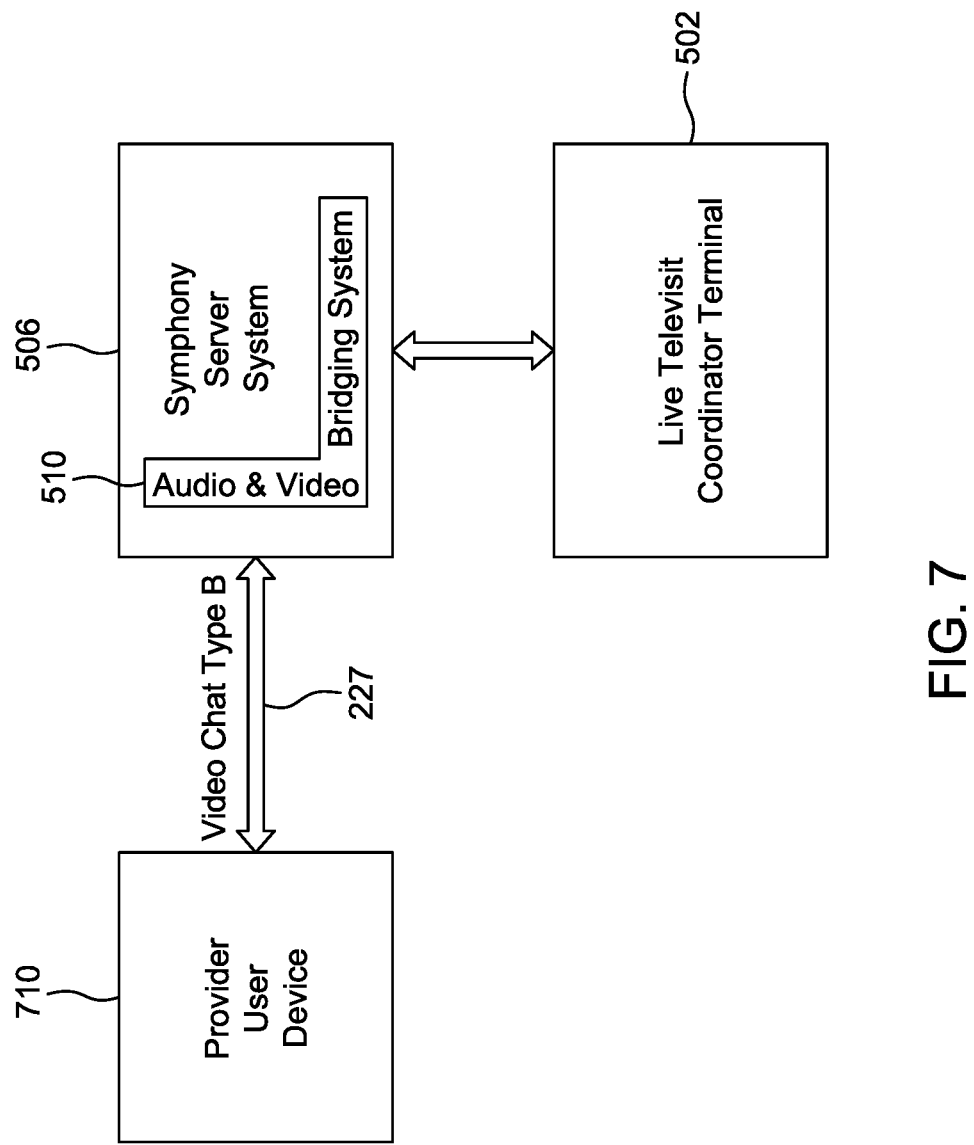
FIG. 7 shows establishment of a video chat channel of a second video chat type, different from the first video chat type, between the televisit coordinator workstation terminal and a provider's video chat user device, in accordance with the principles of the present invention.

FIG. 7 shows establishment of a video chat channel of a second video chat type, different from the first video chat type, between the televisit coordinator workstation terminal and a provider's video chat user device, in accordance with the principles of the present invention.

In particular, as shown in FIG. 7, if a clinician/provider is running late, then the televisit coordinator at the televisit coordinator workstation terminal 100 can keep the video chat 229 established with the patient's video chat user device 550 on hold, transmitting to the patient's video chat user device 550 from the central coordinator video chat mirroring terminal 100, branding images or video and audio clips that have been staged, or other video materials while they wait on hold for the televisit coordinator workstation terminal 502 to activate video chat mirroring with their assigned provider's video chat user device 710. The televisit coordinator workstation terminal 502 preferably maintains an established video chat with the provider's video chat user device 710 while waiting for the provider to be ready to speak with the patient at the patient's video chat user device 550. This enables a provider with the time to read a medical chart for the patient, finish a prior call via another device, etc. Then, once the clinician is ready, the televisit coordinator workstation terminal 502 activates and combines the two separate video chat channels 227, 229 together to form what appears to the end devices to be one end-to-end video chat between the patient's user device 550 and the provider's user device 710, as depicted in FIG. 8.

Figure 8:
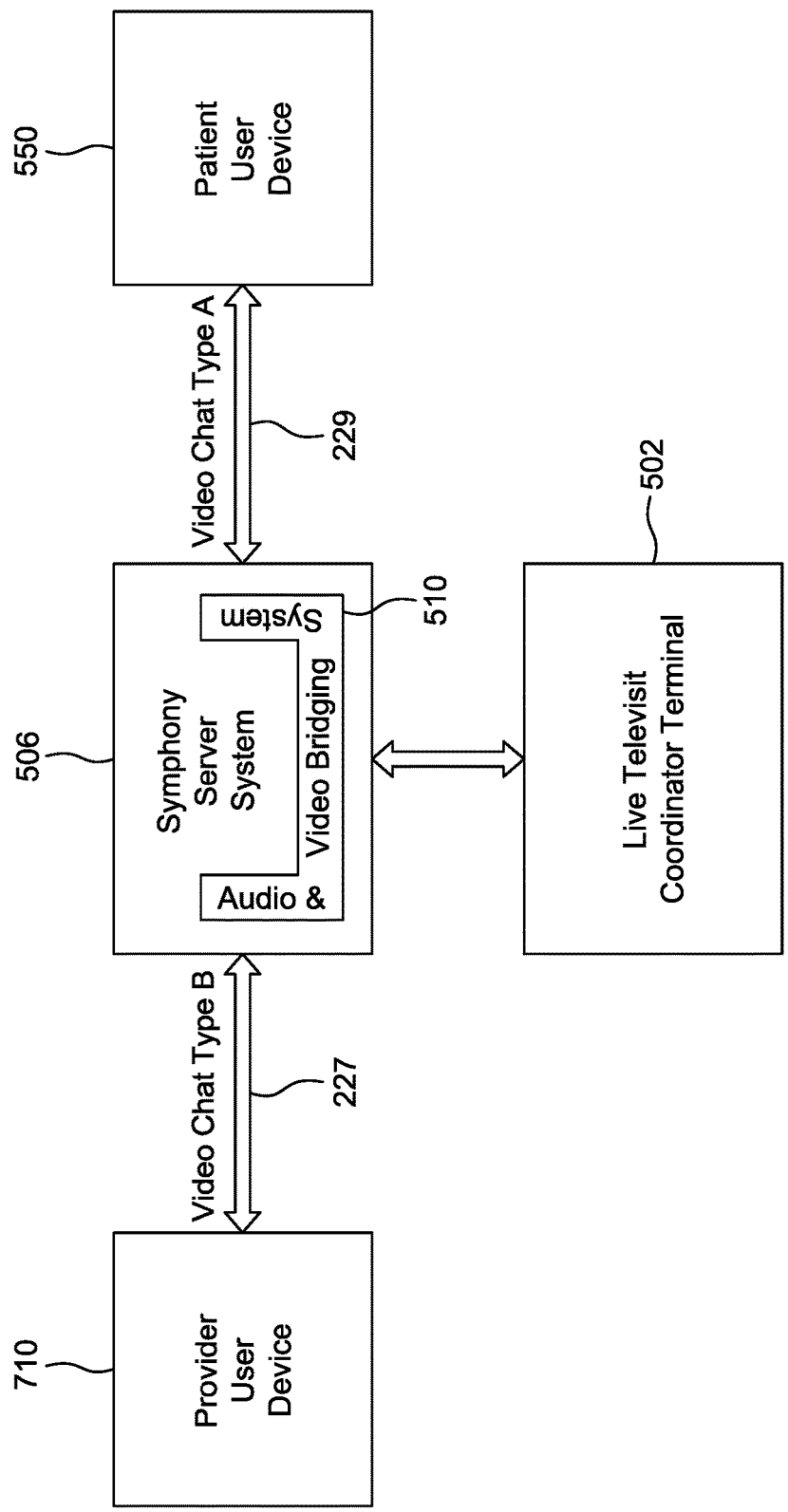
FIG. 8 shows establishment of a point-to-point-to-point-to-point video chat channel between a patient user device using a first video chat type, a provider user device using a second video chat type, and a televisit coordinator workstation terminal therebetween, in accordance with the principles of the present invention.

In particular, FIG. 8 depicts establishment of a point-to-point-to-point-to-point video chat channel between the patient's video chat user device 550 using a first video chat type, the provider's video chat user device 710 using a second video chat type, and the televisit coordinator workstation terminal 502 therebetween.

Video chat consultation sessions between a provider's video chat user device 710 and a patient's video chat user device 550 are managed by a trained coordinator at the intermediary televisit coordinator workstation terminal 502. Each video chat consultation session may be customized at the central coordinator video chat mirroring terminal 100 to reflect a brand for the provider of the healthcare in that session with interjected images and/or video clips, to ensure a consistent, familiar and comforting patient experience.

Operation of the Televisit Coordinator Workstation Terminal

From a call coordination panel on one of the displays 114 of the televisit coordinator workstation terminal 502, the televisit coordinator may set the provider interface of the provider video client to a welcome screen. Then the televisit coordinator workstation terminal 502 opens the desired video client on connecting computer A 122 to begin a connection to the provider's video chat user device 710. The televisit coordinator workstation terminal 502 enters the provider's video client user name in the provider video client, and initiates a connection to the provider's video chat user device 710. The televisit coordinator workstation terminal 502 may switch the provider's video client to full screen mode, and make display orientation changes if necessary. Once the provider's video chat user device 710 answers the video chat and is visible on a provider portion of the display screen 114 at the televisit coordinator workstation terminal 502, the televisit coordinator workstation terminal 502 switches the displayed call coordination panel to coordinator-to-provider mode to initiate a live video session with the provider's video chat user device 710.

The televisit coordinator at the televisit coordinator workstation terminal 502 may greet the provider, and ask about the quality of the connection and troubleshoot any audio or video connection issues as necessary until satisfied with the connection. The televisit coordinator workstation terminal 502 may then place the provider's video chat user device 710 on hold, e.g., by selection of a "hold" control relating to the provider side of the call coordination panel.

Ideally, the video aspect ratio should be set to full screen so that user A's video takes up the full frame of the video output to user B's computer B (PC2), and vice versa. The required video aspect ratios are ideally set as part of the setup process by the coordinator workstation computer (PC3).

The live operator of the televisit coordinator workstation terminal 502 then bridges together with the video chat mirror the two separate video and audio streams 227, 229 (a first 227 between the televisit coordinator workstation terminal 502 and the provider's video chat user device 710; and the other 229 between the televisit coordinator workstation terminal 502 and the patient's video chat user device 550.) Preferably the televisit coordinator workstation terminal 502 joins the two separately established video and audio links 227, 229 with the televisit coordinator maintaining a singular presence in the joined video chat.

Connecting the Patient User Device to the Provider User Device

Once the patient's video chat user device 550 and the provider's video chat user device 710 are connected and on hold, the televisit coordinator workstation terminal 502 initiates a patient-to-provider connection. The televisit coordinator workstation terminal 502 switches the call coordination panel to a coordinator-to-both mode to display the video chat mirrored video and audio feed with both the patient's video chat user device 550 and the provider's video chat user device 710. At this point the patient and the provider see and hear the televisit coordinator, and all parties can hear each other. The televisit coordinator workstation terminal 502 may acknowledge that the patient's video chat user device 550 and the provider's video chat user device 710 are connected, and then instruct the patient and provider that they will then be placed into a private, mirrored video chat communication channel to continue their televisit.

Figure 9:
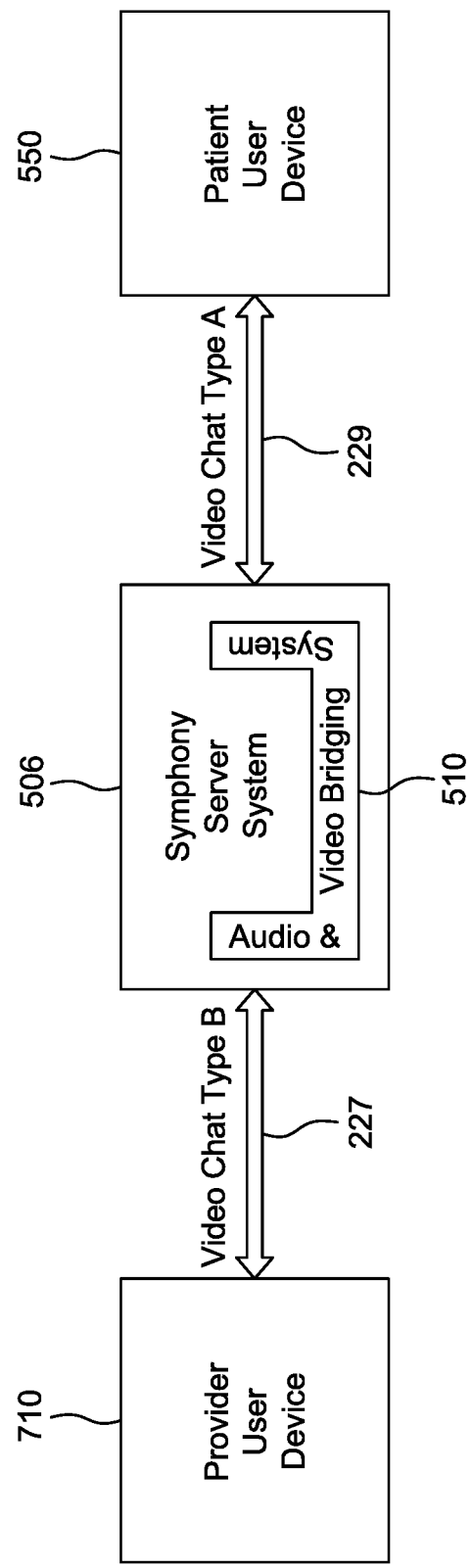
FIG. 9 shows establishment of a point-to-point-to-point-to-point video chat channel between a patient user device using a first video chat type, and a provider user device using a second video chat type, after the televisit coordinator workstation terminal removes itself as a party to the respective video chats, in accordance with the principles of the present invention.
Figure 10A:
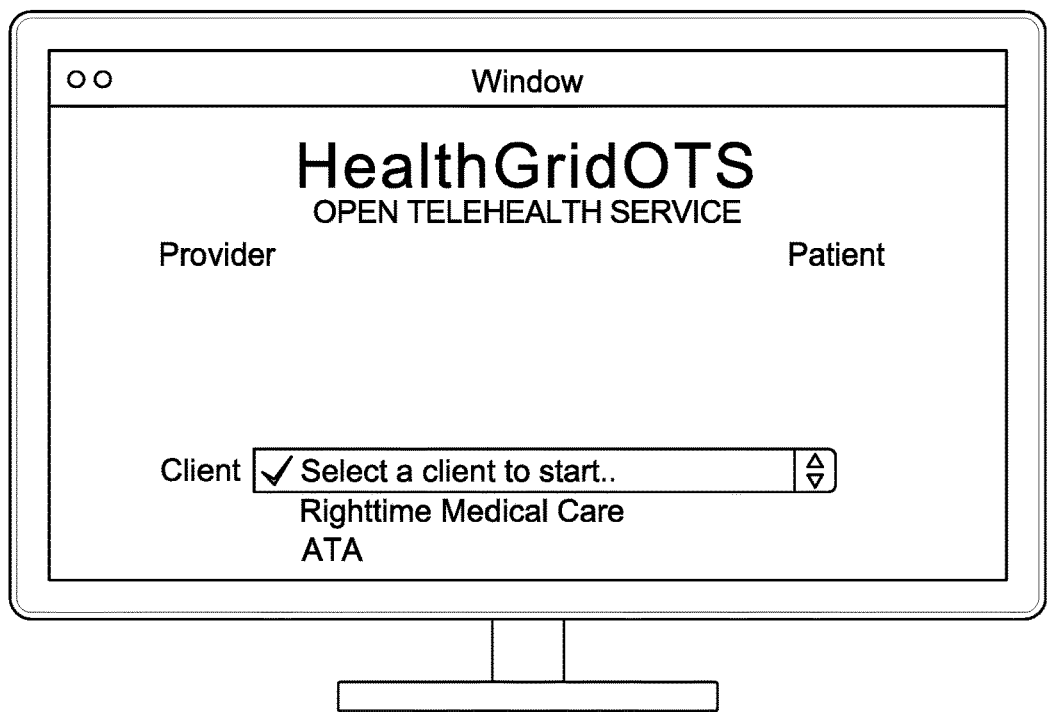
FIGS. 10A-10E show exemplary control screens on a call coordination panel, in accordance with an embodiment of the present invention.
Figure 10B:
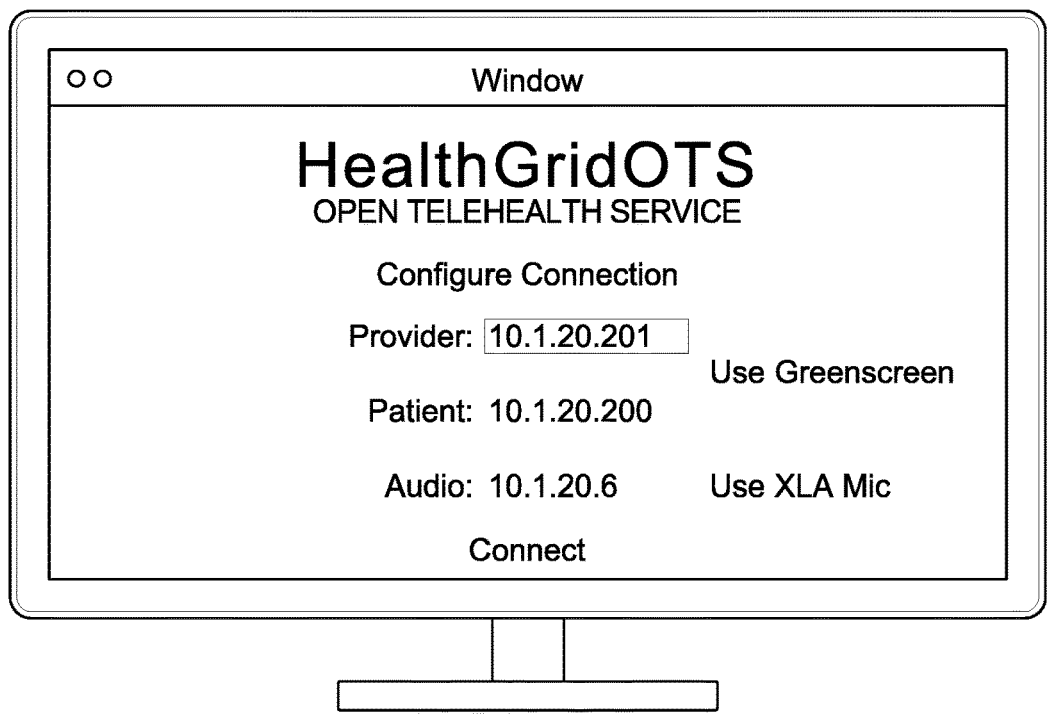
Figure 10C:
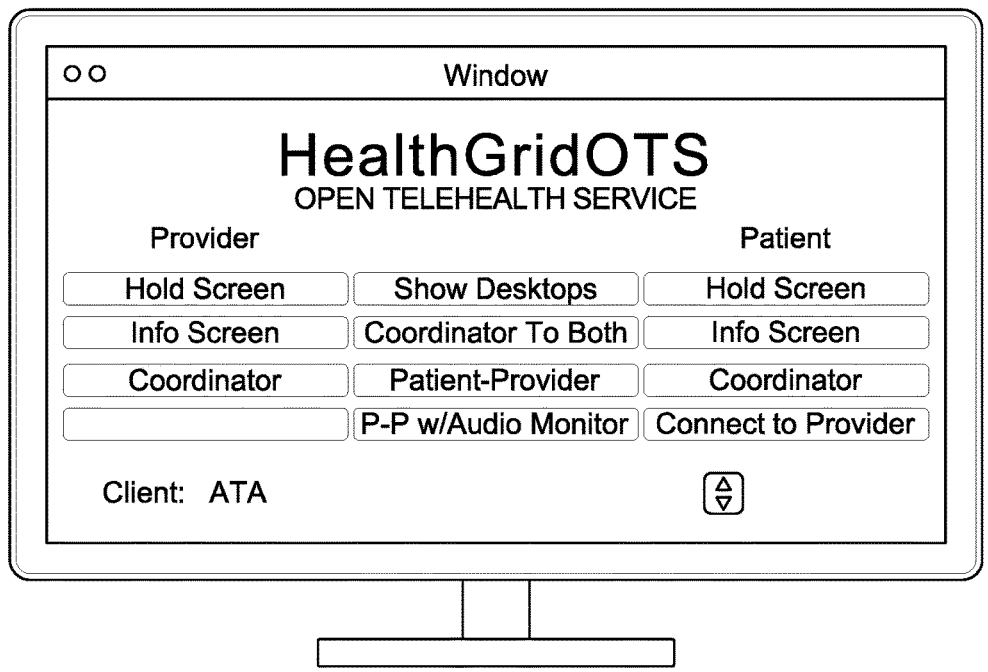
Figure 10D:
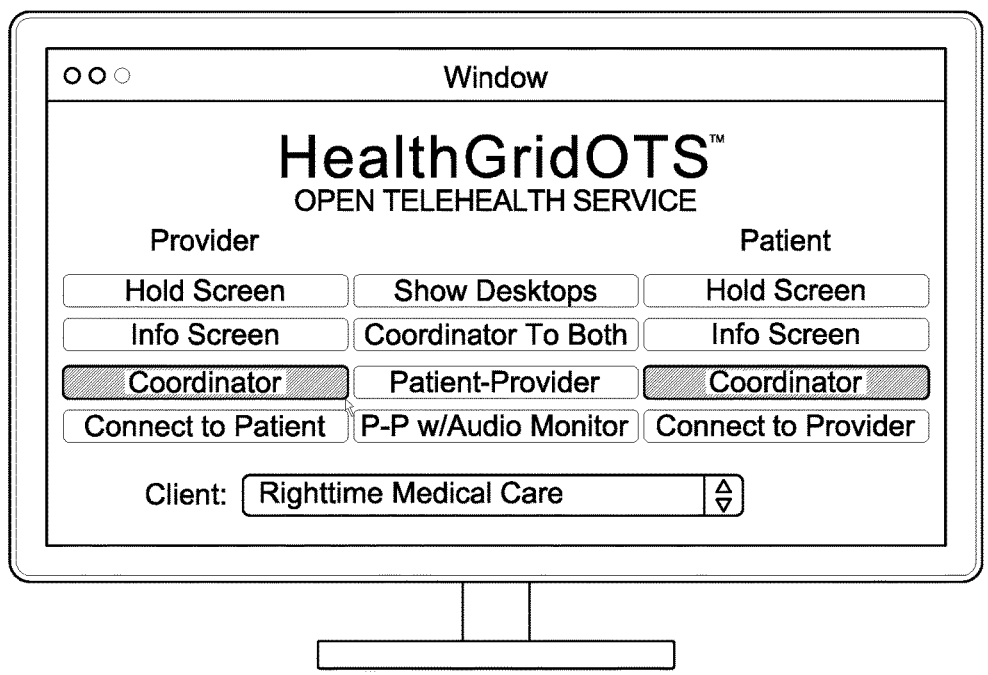
Figure 10E:
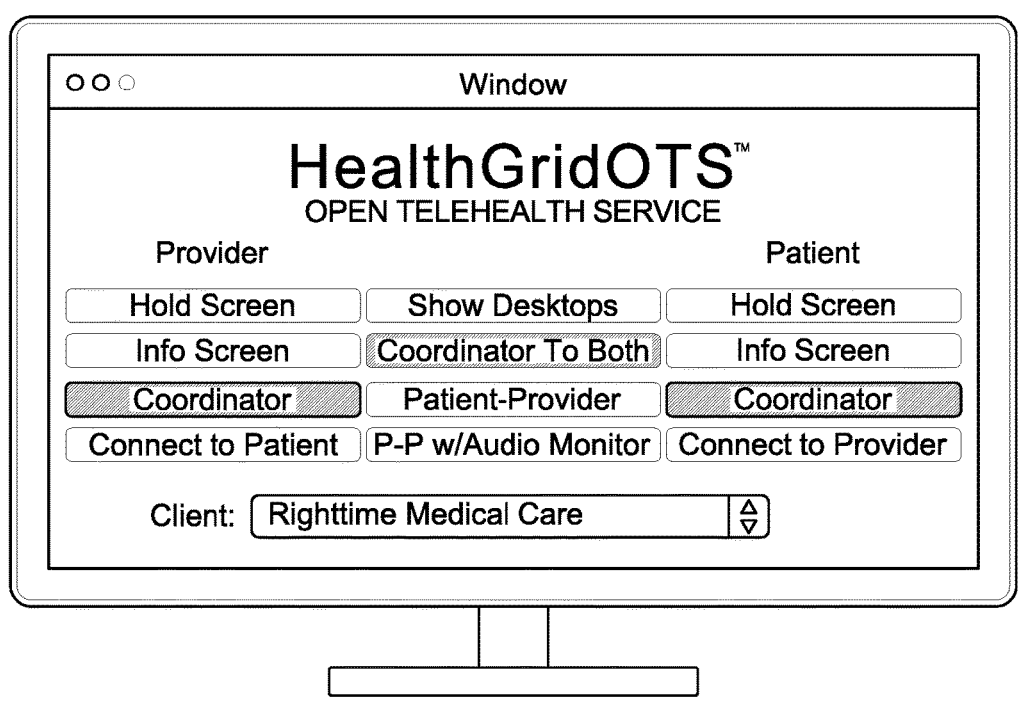

The televisit coordinator workstation terminal 502 may briefly monitor and observe in the point-to-point-to-point-to-point mirrored video and audio chat between the provider's video chat user device 710 and the patient's video chat user device 550 to ensure that the patient and provider can see and hear one another on their respective user devices 550, 710. Once confirmed, the televisit coordinator workstation terminal 502 may disconnect itself from the point-to-point-to-point-to-point mirrored video and audio chat by initiating a disconnect on the call coordination panel. Note, however, that the mirrored video chat remains a point-to-point-point video chat, with the video chat mirroring bridge of the central coordinator video chat mirroring terminal 100 between the provider's video chat user device 710 and the patient's video chat user device 550, as depicted in FIG. 9.

The disclosed multi-channel, two-way video mirroring communication system is modular, reproducible, and scalable to maximize the use of expensive video equipment at the coordinator terminal. In a disclosed embodiment, up to 6 simultaneous telehealth video conversations are possible, using 6 sets of PCs, but all set up by the same one coordinator terminal. It typically requires anywhere between 30 seconds and 5 minutes of time of the coordinator terminal to setup a call, then the coordinator terminal can remove itself from that channel and move on to setting up another simultaneous call.

The central coordinator video chat mirroring terminal 100 preferably additionally facilitates assemblage of medical records for the relevant patient associated with the patient's video chat user device 550, and presents the medical records to the clinician (e.g., doctor) at the provider's video chat user device 710. Preferably the medical records are transmitted to the provider's video chat user device 710 out-of-band of the mirrored video chat 227, 229 such that the clinician can both converse with the patient's video chat user device 550, as well as view that patient's medical records as required.

Thus, the mirrored video chat communication channel between the provider's video chat user device 710 and the patient's video chat user device 550 remains for the entirety of the video chat call a point-to-point-to-point-to-point call, with the central coordinator video chat mirroring terminal 100 being an intermediary party between the provider's video chat user device 710 and the patient's video chat user device 550.

The patient's video chat user device 550 and/or the provider's video chat user device 710 may each simply hang up when they are done with their televisit video chat call. The televisit coordinator workstation terminal 502 may then initiate a patient-to-provider mode from the call coordination panel. This action connects the patient's video chat user device 550 and the provider's video chat user device 710 into a point-to-point-to-point-to-point video chat, resulting in a directly-connected experience between the patient and the provider.

Importantly, at this point the patient's video chat user device 550 and the provider's video chat user device 710 are in a private, point-to-point-to-point-to-point video chat (i.e., call) by way of the video chat mirroring in the central coordinator video chat mirroring terminal 100, with the televisit coordinator workstation terminal 502 by then being a non-participant in the call. This enables the televisit coordinator workstation terminal 502 to become available to coordinate the next televisit.

FIGS. 10A-10E show exemplary control screens on a call coordination panel as described above, in accordance with an embodiment of the present invention.

When the televisit coordinator workstation terminal 502 has a button activated on its control terminal display screen (or control portion of a multi-view single display screen) 114, to, e.g., "Display a Hold Screen", or "Connect Patient's User Device to Provider's User Device", multiple video bridge changes and multiple audio bridge changes are made to place the correct video and audio channels in the correct place to achieve the desired result.

Figure 11:
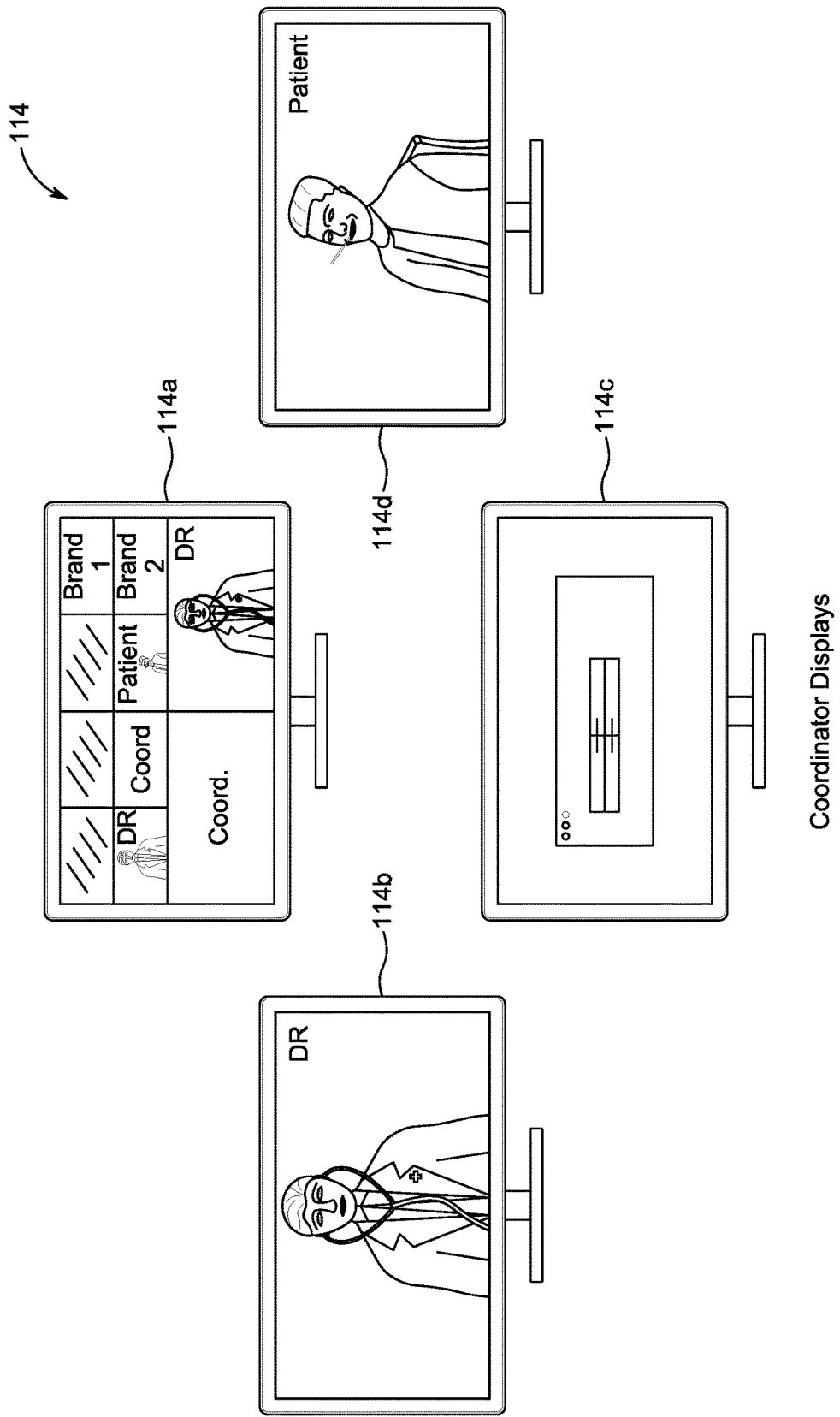
FIG. 11 shows displays connected to an exemplary televisit coordinator workstation terminal, in accordance with the principles of the present invention.

FIG. 11 shows exemplary displays connected to an exemplary televisit coordinator workstation terminal, in accordance with the principles of the present invention.

In particular, as shown in the embodiment of FIG. 11, the coordinator displays 114 of the televisit coordinator workstation terminal 502 may comprise a plurality of displays 114a-114d. Although four separate display screens 114a-114d are shown collectively as the display screen 114, a televisit coordinator workstation terminal 502 may be implemented with fewer physical display screens, and even with only a single physical display screen visually partitioned to show multiple views (e.g., see the depiction of display 114a in FIG. 11.)

While the inventive video and audio mirroring is disclosed and described with respect to a telehealth application, the principles of the present invention relate equally to applications outside of the healthcare field.

While the invention has been described with reference to the exemplary embodiments thereof, those skilled in the art will be able to make various modifications to the described embodiments of the invention without departing from the true spirit and scope of the invention.

What is claimed is:

1. A method of enabling telehealth consultation using video chat devices having disparate video clients, comprising:
connecting a first camera of a first video chat user device using a first type video client, with a first display of a remote coordinator workstation terminal;
extracting first audio from the first video chat user device and separately routing the extracted first audio out-of-band with respect to associated first video, to a speaker of the remote coordinator workstation terminal;
connecting a second camera of a second video chat user device using a second type video client different from the first type video client, with a second display of the remote coordinator workstation terminal; and
extracting second audio from the second video chat user device and separately routing the extracted second audio out-of-band with respect to associated second video, to the speaker of the remote coordinator workstation terminal;
wherein a display-only of said first video chat user device is mirrored with a display-only of said second video chat user device, to effectively form a mirrored display-only communication channel between said first video chat user device and said second video chat user device;
wherein said video mirroring enables said first video chat user device using said first type video client to video chat with said second video chat user device using said second type video client; and wherein the extracted audio portion corresponding to the mirrored display-only communication channel is routed 'out-of-band' with respect to the corresponding display-only portion of the mirrored display-only communication channel.

2. The method of enabling telehealth consultation using video chat devices having disparate video clients according to claim 1, wherein:
said mirrored display-only communication channel remains a point-to-point-to-point-to-point video chat call for a duration of a video chat call by the first video chat user device.

3. The method of enabling telehealth consultation using video chat devices having disparate video clients according to claim 1, wherein:
said first video chat user device is remote from said remote coordinator workstation terminal.

4. The method of enabling telehealth consultation using video chat devices having disparate video clients according to claim 3, wherein:
said second video chat user device is remote from said remote coordinator workstation terminal.

5. The method of enabling telehealth consultation using video chat devices having disparate video clients according to claim 1, wherein:
said first video chat user device is an iPhone.

6. The method of enabling telehealth consultation using video chat devices having disparate video clients according to claim 1, wherein:
said first type video client is FACETIME™.

7. The method of enabling telehealth consultation using video chat devices having disparate video clients according to claim 6, wherein:
said second type video client is SKYPE™.

8. The method of enabling telehealth consultation using video chat devices having disparate video clients according to claim 2, wherein:
said video chat is initiated by the remote coordinator workstation terminal.

9. The method of enabling telehealth consultation using video chat devices having disparate video clients according to claim 1, wherein:
said first video chat device and said second video chat device establish separate and simultaneous point-to-point video chats with the remote coordinator workstation terminal before said video mirroring.

10. Apparatus for enabling telehealth consultation using video chat devices having disparate video clients, comprising:
means for connecting a first camera of a first video chat user device using a first type video client, with a first display of a remote coordinator workstation terminal;
means for extracting first audio from the first video chat user device and separately routing the extracted first audio out-of-band with respect to associated first video, to a speaker of the remote coordinator workstation terminal;
means for connecting a second camera of a second video chat user device using a second type video client different from the first type video client, with a second display of the remote coordinator workstation terminal; and
means for extracting second audio from the second video chat user device and separately routing the extracted second audio out-of-band with respect to associated second video, to the speaker of the remote coordinator workstation terminal;
wherein a display-only of said first video chat user device is mirrored with a display-only of said second video chat user device, to effectively form a mirrored display-only communication channel between said first video chat user device and said second video chat user device;
wherein said video mirroring enables said first video chat user device using said first type video client to video chat with said second video chat user device using said second type video client; and
wherein the extracted audio portion corresponding to the mirrored display-only communication channel is routed 'out-of-band' with respect to the corresponding display-only portion of the mirrored display-only communication channel.

11. The apparatus for enabling telehealth consultation using video chat devices having disparate video clients according to claim 10, wherein:
said mirrored display-only communication channel remains a point-to-point-to-point-to-point video chat call for a duration of a video chat call by the first video chat user device.

12. The apparatus for enabling telehealth consultation using video chat devices having disparate video clients according to claim 10, wherein:
said first video chat user device is remote from said remote coordinator workstation terminal.

13. The apparatus for enabling telehealth consultation using video chat devices having disparate video clients according to claim 10, wherein:
said first video chat user device is an iPhone.

14. The apparatus for enabling telehealth consultation using video chat devices having disparate video clients according to claim 10, wherein:
said first type video client is FACETIME™.

15. The apparatus for enabling telehealth consultation using video chat devices having disparate video clients according to claim 14, wherein:
said second type video client is SKYPE™.

* * * * *